Patented July 25, 1939

2,167,221

UNITED STATES PATENT OFFICE 2,167,221

CASEIN PAINT

Herman A. Scholz, Oak Park, Ill., assignor to United States Gypsum Company, Chicago, Ill., a corporation of Illinois No Drawing. Application October 30, 1935, Serial No. 47,412

5 Claims. (Cl. 134—50)

The present invention relates to an improvement in water paints, particularly those based upon casein as a binder.

In its broadest aspects, the invention relates to a casein paint which may be in the form of a dry powder capable, by addition of water, of being converted into a ready-to-use paint, or may consist of a heavy paste-like compound or mixture which may be sold as such and then employed by the user either in its original condition or after dilution with water or other solvents.

One of the particular objects of the invention is to improve the working properties, keeping qualities and stability of casein paints containing pigments, by the expedient of employing therein organic compounds of the type generaly known as salicyl compounds.

A further object of the invention is to improve the qualities of aqueous casein paints by incorporating therewith pigments which have increased dispersing qualities by reason of their having been treated with or associated with salicyl compounds, and particularly such materials as salicylic acid, salicylic acid salts, salicylic acid esters, and amides.

As an exemplification of the invention, it may be mentioned that a casein paint may be prepared in the form of a dry powder by mixing the following materials in or about in the proportions specified, these proportions being by weight:

| | Parts |
|---|---|
| Zinc sulphide pigment | 127.6 |
| Casein | 24 |
| Mica in the form of a fine powder | 10 |
| A pulverulent filler such as whiting, talc, clay, or similar substantially inert mineral substance | 20 |
| Anhydrous sodium borate (borax glass) | 2.2 |
| Sodium fluoride (NaF) | 2 |
| Calcium hydroxide | 14 |
| Irish moss | 0.2 |
| Pine oil | 2 |

In the above formula the proportions may, of course, be varied considerably; thus the zinc sulphide pigment may be replaced wholly or in part by other pigments such as titanium dioxide, Titanox, iron oxide, chromium pigments, cadmium pigments, and the like. The term "zinc sulphide pigments" is a group name for such pigments as zinc sulphide, zinc sulphide plus barium sulphate or calcium sulphate, zinc sulphide plus titanium compounds either alone or in combination with barium or calcium sulphate, zinc sulphide on magnesium or other silicates or clays, etc. These are usually called "lithopone", "titanated lithopone", etc.

The dry powder constituted along the lines above indicated may be marketed and employed by the user by mixing the same with about an equal weight of water and stirring until a smooth mixture results. This then forms a paint suitable for application either by brush or spray gun.

As an exemplification of the manufacture of a casein paint in paste form, the following formula may be used:

| | Parts |
|---|---|
| Casein | 220 |
| Alkaline solvent | 53.8 |
| Water | 1000 |
| Zinc sulphide pigment | 1600 |
| Mica | 100 |
| Pine oil | 20 |

In compounding either of the above formulas the zinc sulphide, or other pigment employed, has incorporated therewith, prior to its introduction into the casein and water mixture, a small amount of a salicyl compound generally on the order of from 0.05% to 0.5%, although an amount equivalent to about 0.1% is generally sufficient for the purpose. The salicyl compound may be either salicylic acid itself, which in fact is to be preferred, or a salt or ester, or other organic derivative of salicylic acid such as acetyl salicylic acid, methyl salicylate, salicylic aldehyde, and the like, or mixtures thereof.

It has been found that the addition of the salicyl compound to the solution instead of to the pigment does not give as satisfactory results. The reason for this is that the salicylic acid is a water-soluble material and, being of an acidic nature, tends to become neutralized by the alkalinity of the casein solution and hence dispersed therein in such a form as to prevent its coming into effective contact with the pigment. Inorganic salts of salicylic acid; compounds in which the salicyl radical corresponds to the alkali component, and similar salicyl compounds and esters, may also be employed; all of such types being intended under the term "salicylic compounds."

These salicyl compounds are incorporated with the pigment by thorough mixing, preferably by grinding the pigment with the added material in a ball mill. It appears highly probable that the salicyl compound becomes oriented upon the surface of the zinc sulphide pigments and thereby alters their wettability characteristics.

A particular advantage which resides in the use of the salicyl compound treated zinc sulphide pigments lies in the fact that the casein paints made therefrom will permit of the addition of calcium hydroxide or lime without the rapid insolubilization that usually occurs upon the addition of lime. Thus, for example, in order to produce a painted surface that is particularly resistant to water, it has been the practice to add to, say, one gallon of the paste paint from 3 to 5 ounces of hydrated lime (calcium hydroxide). When this is done with a paste made with a pigment treated with salicyl compounds, a smooth mixture results, which can be spread without difficulty and will not show brush marks or other defects. If however a similar amount of lime were added to a casein paste paint made in the same way but omitting the salicyl compounds, the lime would rapidly react with the paint, causing it to gel and rendering it very difficult, if not impossible, of application. At present it is not understood what reactions underlie this phenomenon, but it is a proved fact that casein paste paint made with pigment that has been treated with salicylates will withstand the addition of lime, whereas paint that is made without the salicylates cannot be thus treated.

The same thing is true of the formula given in connection with the dry paint. Thus if instead of using the salicyl compound treated pigment one were to use the pigment in its ordinary condition and were to use the amount of lime specified in the first formula, this would form a spreadable compound, which however would by no means be smooth and would contain gritty particles which would prevent the formation of a smooth and uniform coating. Furthermore, the tendency of the pigment to settle out is much greater when the salicyl compounds are omitted than when they are present. In commercial practice, this tendency of the paint is spoken of as "grit," but the exact nature of what these small aggegations are has not been possible to determine. The fact remains that when salicyl compounds are used, the presence of the 14 parts of lime in the formula for the dry paint above given is found to be satisfactory, while otherwise the lime would have to be greatly reduced in amount or possibly omitted, with concomitant depreciation in the value of the dry powdered casein paint, because in such a case it would not be as resistant to water as is the case when a sufficient quantity of lime is present to form the casein-lime complex which causes the insolubilization of the paint.

In the above formulas the casein solvents may consist of borax, borax glass, sodium or potassium hydroxide, trisodium phosphate, sodium or potassium carbonate, sodium fluoride, sodium sulphite, or other suitable known casein-solubilizing materials, or combinations of the same. In the paste formula there may also be present a certain quantity of sodium stannate or other alkali salt of an amphoteric metal, or its equivalent, for the purpose of additionally stabilizing the casein paste paint by preventing the undesired hydrolysis of the casein molecule.

The formulas may also be varied as to the extent of the percentage of fillers therein used, and of course it is within the scope of the invention to add additional coloring pigments.

In the hereunto appended claims the term "pigment" is intended to cover pigments and fillers as well as coloring matter.

In the dry powdered paint the function of the lime, as already mentioned, is the insolubilization of the casein. This may, of course, be replaced by other known materials which have a casein-insolubilizing effect, such as chromium compounds as, for example, sodium or potassium dichromate, which, particularly under the influence of light, tend to render the casein highly resistant to water.

I claim:

1. Casein paint comprising casein, borax glass, sodium fluoride, calcium hydroxide, and a zinc sulphide pigment coated with a very small amount of a salicyl compound from the group consisting of salicylic acid, salicylic acid salts, salicylic acid esters, and salicylic acid amides.

2. A casein paint in paste form comprising casein, an alkaline solvent therefor in an amount sufficient to dissolve the casein, water, and a zinc sulphide pigment which has clinging thereto substantially over all of its surface a small amount of a salicyl compound from the group consisting of salicylic acid, salicylic acid salts, salicylic acid esters, and salicylic acid amides.

3. Casein paint in paste form comprising casein, an alkaline solvent in an amount sufficient to dissolve the same, water, and zinc sulphide pigment which has clinging thereto substantially over all of its surface from 0.05% to 0.5% of its weight of a salicyl compound from the group consisting of salicylic acid, salicylic acid salts, salicylic acid esters, and salicylic acid amides.

4. Casein paint in paste form comprising casein, an alkaline solvent in an amount sufficient to dissolve the same, water, and zinc sulphide pigment which has clinging thereto substantially over all of its surface about 0.1% of its weight of a salicyl compound from the group consisting of salicylic acid, salicylic acid salts, salicylic acid esters, and salcylic acid amides.

5. Casein paint comprising casein, an alkaline solvent in an amount sufficient to dissolve the casein, and a zinc sulphide pigment which has clinging thereto substantialy over all of its surface a small amount of a salicyl compound from the group consisting of salicylic acid, salicylic acid salts, salicylic acid esters, and salicylic acid amides.

HERMAN A. SCHOLZ.